United States Patent [19]

Schroder

[11] 3,869,672

[45] Mar. 4, 1975

[54] METHOD AND ARRANGEMENTS FOR THE DIGITAL CONTROL OF OPERATING FUNCTIONS, RADIO AND TELEVISION RECEIVERS

[75] Inventor: Wolfgang Schroder, Pforzheim, Germany

[73] Assignee: International Standard Electric Corporation, New York, N.Y.

[22] Filed: Apr. 23, 1973

[21] Appl. No.: 353,880

[30] Foreign Application Priority Data

May 13, 1972 Germany ............................ 2223487

[52] U.S. Cl. ............................ 325/392, 340/168 R

[51] Int. Cl. ............................ H04q 3/00

[58] Field of Search ........... 325/390, 391, 392, 464, 325/465, 469, 470; 343/225, 228; 318/16; 317/134, 138, 139, 140; 340/168 R, 170, 171 R

[56] References Cited

UNITED STATES PATENTS

| | | | |
|---|---|---|---|
| 3,518,586 | 6/1970 | Nilssen | 325/465 |
| 3,665,318 | 5/1972 | Hoffman et al. | 325/470 |
| 3,671,870 | 6/1972 | Wellhausen | 325/470 |
| 3,678,392 | 7/1972 | Houghton | 325/392 |
| 3,757,303 | 9/1973 | Blass | 340/171 R |
| 3,758,864 | 9/1973 | Kanamaru | 325/392 |

*Primary Examiner*—Benedict V. Safourek
*Attorney, Agent, or Firm*—John T. O'Halloran; Menotti J. Lombardi, Jr.

[57] ABSTRACT

In a remote control system of the type that controls a number of operating functions by transmitting a number of frequencies corresponding to the operating functions to be controlled, a receiver including receiving means that is tuned by a fixed capacitor and a number of additional capacitors that are periodically connected in parallel combinations with the fixed capacitor by an electronic rotary switch so that the receiver is successively tuned to each of the possible transmitted frequencies. An amplitude filter means is provided for sensing an increased receiver means output when the receiver means is tuned to the frequency being transmitted and for providing an output during the period when the receiver is so tuned. The electronic rotary switch successively connects the receiver means output to the operating function corresponding to the frequency to which the receiver means is tuned. Whereby an operating function receives an operating pulse if the transmitter is tuned to the frequency corresponding to that particular operating function.

14 Claims, 15 Drawing Figures

Function Signal
„ OR - Gate"

| Inputs | | Output |
|---|---|---|
| E1 | E2 | A |
| Ø | Ø | Ø |
| L | Ø | L |
| Ø | L | L |
| L | L | L |

Function Signal
„ NOR - Gate"

| Inputs | | Output |
|---|---|---|
| E1 | E2 | A |
| Ø | Ø | L |
| L | Ø | Ø |
| Ø | L | Ø |
| L | L | Ø |

„ Inverter "

| Input E | Output A |
|---|---|
| Ø | L |
| L | Ø |

METHOD AND ARRANGEMENTS FOR THE DIGITAL CONTROL OF OPERATING FUNCTIONS, RADIO AND TELEVISION RECEIVERS

BACKGROUND OF THE INVENTION

The present invention relates to methods of and arrangements for effecting the digital control of operating functions with the aid of current or voltage steps, preferably in radio and television receivers.

Electronic information storages are already known which, among others, also serve to store voltage values for the step-by-step control of operating functions in radio and television receivers. One already proposed economical solution resides in the fact that the steps are formed in one direction successively by means of forward counting pulses at the counting input of a digital counting circuit or a digital information storage, and are respectively reset by one step via the same counting input in the same direction (cycle) by means of a burst of (N-1)-pulses, with N being indicative of the total number of counting steps forming one complete counting cycle.

According to further embodiments of the aforementioned proposal there are, among others, also arrangements for generating the (N-1)-backward counting burst as well as the feeding thereof to the counting input of a counting chain, so that the counting chain associated with each independent control function is thus provided with two counting inputs: one for feeding-in an individual pulse for each forward step of the operating or control function, and another one for feeding-in one (N-1)-burst for each backward step of the operating or control function.

Up to now it has been common practice in connection with the remote control of the operating functions in radio and television receivers, for each operating function to be allotted one control frequency of its own. Accordingly, in the majority of the customarily used ultrasonic remote control arrangements, each operating function has its own ultrasonic frequency.

Apart from the considerable technical investment involved, this method still has the disadvantage of requiring an alignment of these frequencies, which has to be carried out on the ultrasonic transmitter as well as on the ultrasonic receiver. Since the forward and backward controls respectively have to be counted as separate functions, the remote control of color television receivers, for example, at least requires eight different control frequencies. It is also a disadvantage that such arrangements, cannot, without further ado, be designed in accordance with the known integrated circuit technique, because the necessary inductors, and partly also the larger capacitors, are not yet suitable for integration.

The invention is based on the problem of providing methods of and arrangements for effecting the digital control of operating functions with the aid of current or voltage steps avoiding the aforementioned disadvantages.

It has already been proposed to generate for each of several operating functions to be performed, one encoded pulse number each for serving as the command signal, and to repeat it for each new operating step, to send this command signal over a common transmission path, to store it temporarily, to decode it, and to use it for tripping the digital operating signal.

In the case of command signals transmitted acoustically within the ultrasonic range, pulse modulation is considerably disturbed by echo signals which are unavoidable in normal living rooms. In such cases it is more advantageous to use different unmodulated frequencies as the command signals. Incidentally, it is of advantage to use in this particular case command signal transmitters which are capable of being switched over to different frequencies. The command signal transmitter, according to an already proposed circuit, may be designed in such a way that the touchable electrodes or their subsequently following circuit arrangement, are connected to an electric matrix circuit consisting of a diode gate, with the diode combination, in the manner known per se, being connected in such a way that frequencies, modulations, pulses and/or capacitors, resistors and/or coils are added to form encoded command signals which are tripped by touching only one electrode, or simultaneously by touching their counter electrode, with these electric signals of the command signal transmitted being fed to an electro-acoustic transducer, preferably an ultrasonic transducer, for effecting the acoustic radiation, or else to a light source, which, for example, may also be a source of infrared light.

The invention is based on the problem of providing for such command signal transmitters a command signal receiver with respect to which, in spite of the switching over to different frequencies, it is sufficient to provide only one alignment or adjustment procedure.

According to the invention this problem is solved in that the command signal receiver comprises a receiving circuit which is switched digitally with the aid of an electronic rotary switch, successively to all command frequencies or to the converted frequencies thereof, that the voltage of the resonant circuit which is increased when being in resonance with the received command signal frequency, and if necessary, after rectification, is fed to an amplitude filter, that the output of this amplitude filter, via the electronic rotary switch, is connected successively either directly or indirectly to the signal outputs which are associated with the command signal frequencies, and that the signal outputs are respectively in connection with the inputs of the circuit which serve to trigger the associated digital operating functions.

The receiving circuit can be tuned with the aid of a variable-capacity diode, with the inverse voltage or the forward current thereof being controlled with the aid of an (e.g., known type of) staircase voltage generator. According to the further invention, a more exact tuning can be achieved in that additional capacitors are connected via electronic switches, in parallel with the basic capacitance of the receiving circuit.

According to one embodiment of the invention the connection in parallel or a respective combination of the capacitors is effected in accordance with a binary system, in that parallel in relation to the basic capacitance of the receiving circuit, for $2^n$ different command signal frequencies, there are only connected $n$ additional capacitors, with the next lower capacitance of which respectively being half as large as the next higher one, that n electronic switches are arranged in series with the n additional capacitors, and that the electronic switches are respectively switched by another output of an $n$-stage binary divider, with the control frequency thereof amounting to $2^n$-times the transmitted clock frequency.

According to another embodiment of the invention it is proposed that the clock signals of the electronic rotary switch or of the binary divider as tripped upon reception of a command signal, are fed to a divider or counter at the output of which there is taken off a slow clock signal for tripping the operating functions.

Another embodiment of the invention resides in the fact that the control frequency as provided by the control oscillator is higher than $2^n$-times the control frequency as required for the electronic rotary switch, and preferably amounts to $2^{(n+m)}$-times thereof, with n and m being integer multiples and greater than zero, and that further dividing stages are arranged between the control generator and the electronic rotary switch or the n-stage binary divider serving to switch the n electronic switches of the n additional capacitors, from which pulses are taken which are shorter than the clock (timed) pulses in certain phase positions. These shorter pulses in certain phase positions, for example, are used as pre- and post-trigger pulses for effecting the pulse regeneration of the received signal.

As a rule, digital remote control circuits are made up in such a way that the timely chosen operating rhythm is automatically given in the receiving stage as long as a command signal is being radiated. In order to keep time delays with respect to the tripping of the first operating step as short as possible, it is advisable to select a substantially quicker cycle of the electronic rotary switch serving the receiving frequency switching, i.e., quicker than the one serving the tripping of an operating function which is practically performed between one half and one second for each alteration step of an operating function. In this way it is possible to achieve the tripping of a first alteration stage for an operating function lying within one cycle of the electronic rotary switch. In cases where a counter is used for achieving a slower operating rhythm from the quicker rotational frequency in the receiver, it should be one of the type which is non-susceptible to radio interferences. To these interferences there are to be counted above all the bursts into the amplitude caused by room reflections during acoustic transmission within the ultrasonic waverange.

Therefore, another embodiment of the invention proposes that a multi-stage, in particular binary encoded counter, receives its first counting pulse from the received command signal via the output as through-connected by the electronic rotary switch as well as via a first input circuit (e.g., OR-gate) which, after the first counting step, is blocked with the aid of the potential reversal at the outputs of the counter, and that all further counting steps, via second input circuit (e.g., NOR-gate), are tripped by an independent sequence of pulses, and that the second input circuit is blocked at the end of each counting cycle by the potential reversal at the outputs of the counter.

The advantages achievable by the invention reside above all in that the receiver circuit permits greater tolerances of the components, that moreover the alignment or adjustment work is only insignificant, and that the error detection is unambiguous. In addition thereto, the circuit can be integrated to a considerable extent. Moreover, a great advantage is seen in that the output signals for releasing the digital operating functions, are already pulse-modulated by the rhythm of the electronic switching, and can be easily prepared for the use in the digital control ciruits serving the operating functions. Apart therefrom, the employed sequences of pulses are phase-locked with respect to one another. Interference by room reflections is effectively prevented.

BRIEF DESCRIPTION OF THE DRAWING

Examples of embodiment of the invention are shown in the accompanying drawings and will now be described in greater detail hereinafter. In the drawings.

DETAILED DESCRIPTION

Figure 1A:
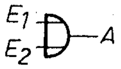
FIGS. 1*a* to 1*c* show the employed function symbols of the digital ranges which are of the type known per se.

For enabling a better understanding of the specification some of the terms and function symbols used in digital engineering referred to in explaining the invention, will now be defined to start with.

The flip-flop elements for the counter and divider circuits shown as small boxes in the drawings, correspond to the type of embodiment as used in the practically realized circuit, e.g., those under the SAJ 110 type designation. Only a positive voltage variation at the input, indicated by L ("high"), reverses the switching state at the output of the flip-flop from $\phi$ (zero, "low") to L and vice versa. If, in a flip-flop chain circuit, all outputs are in the state $\phi$, then an L-signal at the input of the chain will effect the reversal of all outputs from $\phi$ to L.

If one output of the flip-flop is in the L-state, reversal from L to $\phi$ can be effected by applying a temporary $\phi$-pulse directly to this output. Mostly a transistor of the npn-type is used to this end, with the collector thereof being connected to the flip-flop output, and with the emitter thereof being connected to ground potential (=$\phi$). An L-pulse applied to the base will reverse the flip-flop output to $\phi$.

Signals, such as E, F, G which must also be used in the inverted manner, are referred to as E, F, G. With respect to the functioning of the OR-gate (FIG. 1*a*) there apply the following interrelationships:

Table 1

| Inputs | | Output |
|---|---|---|
| $E_1$ | $E_2$ | A |
| $\phi$ | $\phi$ | $\phi$ |
| L | $\phi$ | L |
| $\phi$ | L | L |
| L | L | L |

Only in cases where the inputs are simultaneously set to $\phi$, a $\phi$-signal will appear at the output.

Figure 1B:
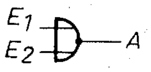

The following applies to the NOR-gate (=OR-circuit) with the following negation. (FIG. 1*b*):

Table 2

| Inputs | | Output |
|---|---|---|
| $E_1$ | $E_2$ | A |
| $\phi$ | $\phi$ | L |
| L | $\phi$ | $\phi$ |
| $\phi$ | L | $\phi$ |
| L | L | $\phi$ |

An L-signal will only appear at the output in cases where the inputs are simultaneously set to $\phi$.

Figure 1C:

The inverter (FIG. 1*c*) corresponds to a simple phase-reversal stage (negation) and contains the "negation point":

Table 3

| Input | Output |
|---|---|
| E | A |
| $\phi$ | L |
| L | $\phi$ |

In order to avoid confusion, the inputs and the outputs relating to the shown function symbols in the drawings, will not be indicated by other letters.

The supply voltage of the ultrasonic remote control receiver and of the associated circuits is stabilized at a value of 10 volts. All of the pulse voltages between $\phi$ and L have a peak voltage ranging between 8 and 10 volts.

Figure 2:
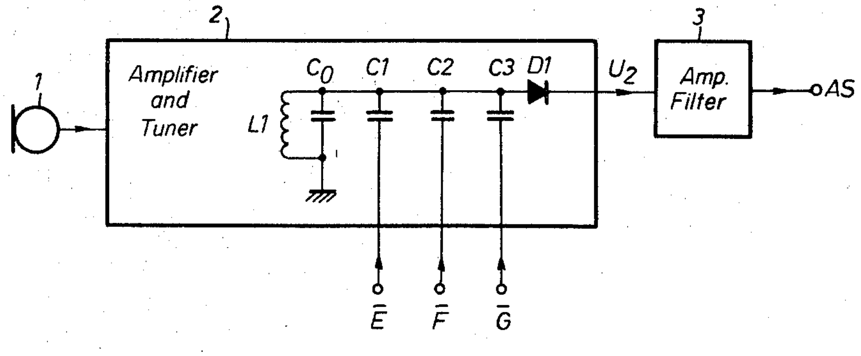
FIG. 2 shows a strongly simplified schematic circuit diagram for explaning the basic principle of the invention.

After this clarification of the employed terms, there will now follow the functional description of the ulstrasonic remote control receiver, i.e., by starting at first with the basic mode of operation of the digital sampling receiver shown in FIG. 2.

The digital sampling receiver.

The static ultrasonic microphone 1 in FIG. 2 is polarized with a d.c. voltage of about −250 volt and applies the received command signals to the input of the four-stage transistor amplifier 2 by which the sinusoidal input voltages are amplified and limited to such an extent that rectangular pulses of about 10 volt are obtainable at the output thereof. The pulses are capacitively fed into the resonant circuit $L1/C_0$ which is aligned to a standard frequency of about 45 kHz. By the capacitors C1, C2 and C3 the resonant circuit is cyclically tuned to seven additional receiving frequencies ranging between 35 and 45 kHz in that they, within a periodic cycle, are electronically connected in parallel by being differently combined. One frequency-shift keying cycle lasts about 80 ms, with each of the eight receiving frequencies being held for a period of about 10 ms.

Figure 3:
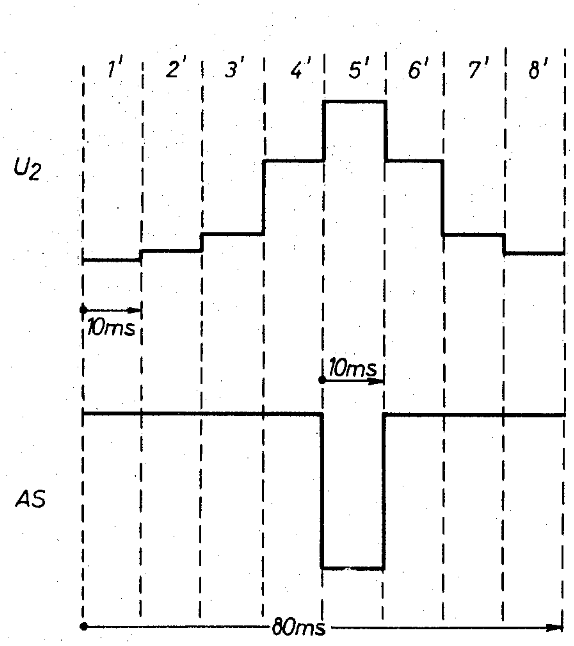
FIG. 3 shows diagrams for explaining the mode of operation of the circuit shown in FIG. 2.

The diode D1 serves to rectify the received command signal as selected in the resonant circuit. It will be seen above the time axis that there is formed a staircase-shaped amplitude curve corresponding to the selection of the resonant circuit, with a phase position as a function of the transmitted command frequency, with a period of 80 ms and a staircase-step width starting from 10 ms. $U_2$ in FIG. 3 shows the oscillogram of an amplitude curve in which, in this particular case, the command signal in the phase position 5' is in resonance with the receiving circuit. On the whole, and in accordance with the capacitor combinations, eight different phase positions indicated by 1' . . . 8' are possible, with respect to which, and quite depending on the receiving or command frequency respectively, there will result a maximum in the staircase amplitude curve as soon as resonance is established between the receiving and the transmitting frequency.

The amplitude filter 3 following in FIG. 2 serves to clip the highest staircase step for making it invertedly available as an AS-signal (amplitude filter signal) to the further evaluation (e.g., at the diode gate). This so-called AS-signal respectively assumes one of the possible eight phase positions which, within one frequency-shift keying cycle, are associated with a certain receiving or transmitting frequency respectively. The AS-signal which is inverted in comparison with 5' of the staircase amplitude curve $U_2$, is shown in FIG. 3 to be in the phase position 5'.

The next item to be described is the control circuit for the receiving frequency shift keying or for switching the capacitors and for the signal distribution respectively.

Figure 4:
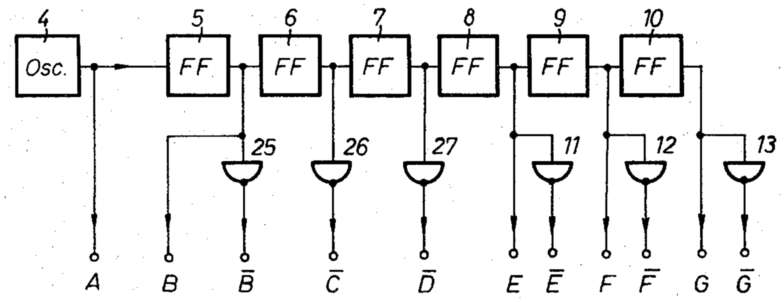
FIG. 4 shows the control circuit for effecting frequency-shift keying and the signal distribution.

The multivibrator 4 in FIG. 4 supplies the input of the 6-element binary flip-flop divider chain 5 to 10 with 1,600 -Hz rectangular pulses of about 10 V. Owing to the consecutive frequency division, the last output of the chain will reach the shift frequency of 12, 5 Hz. The outputs of the last three divider flip-flops 8, 9 and 10, via the inverters 11, 12 and 13, serve to supply the rectangular pulses $\overline{E}$, $\overline{F}$ and $\overline{G}$ which, via electronic switches, cause the capacitors C1, C2 and C3 to be connected in parallel with the receiving circuit.

Figure 5:
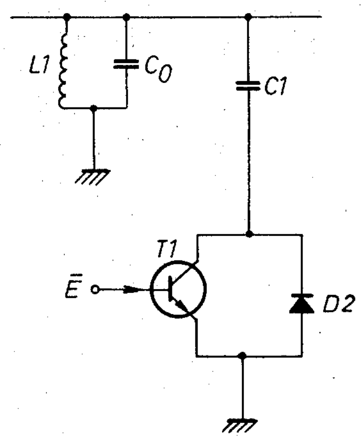
FIG. 5 shows one detail relating to FIG. 4.

The construction of an electronic switch may be taken from FIG. 5: The capacitor C1 is applied to the resonant circuit $L1/C_0$ via the antiparallel connection of both the transistor T1 and the diode D2. In the case of an open base of transistor T1 the diode D2 serves to rectify the oscillating voltage of the resonant circuit, thus producing for itself an inverse voltage. Since also the transistor remains to be blocked, the capacitor C1 remains to be disconnected from the resonant circuit. Only after the L-phase of the rectangular voltage $\overline{E}$ feeds a base current to T1, transistor T1 is rendered conductive for the positive phase, and the diode D2 will become conductive for the negative phase of the oscillating voltage at the resonant circuit, thus causing the capacitor C1 to be connected in parallel with the oscillator circuit.

The same applies to the parallel connection of the capacitors C2 and C3 by the rectangular voltages $\overline{F}$ and $\overline{G}$, with the not shown electronic switches being constructed in analogy with the one shown in FIG. 5.

Figure 6:
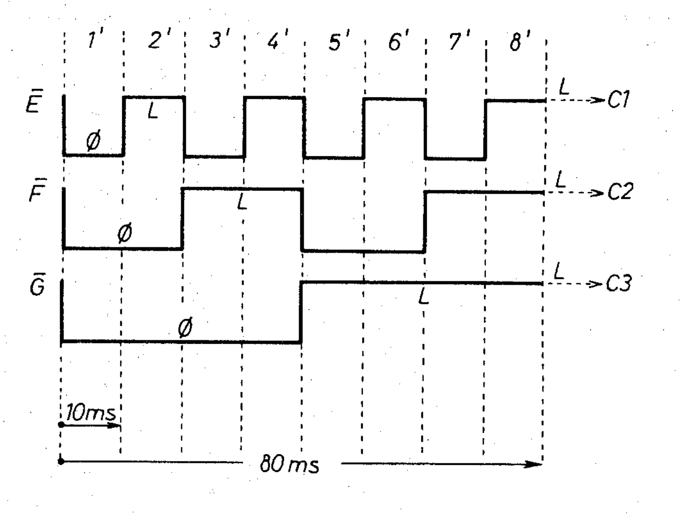
FIGS. 6 and 8 show further diagrams for explaining the mode of operation of the arrangements shown in FIGS. 2 to 5.

The switching states of the capacitors C1, C2 and C3 are described by the diagram shown in FIG. 6 with interference to the rectangular voltages $\overline{E}$, $\overline{F}$ and $\overline{G}$ which, in accordance with the different division, have double the pulse duration of the respectively preceding voltage:

Table 4

$\bar{E}$ controls Cl = 800 pF
$\bar{F}$ controls C2 = 1600 pF = 2 Cl
$\bar{G}$ controls C3 = 3200 pF = 2 C2

The phase positions (similar as in FIG. 3) are indicated by 1' . . . 8', and the switching states are indicated as follows:

φ=capacitor disconnected and
L=capacitor connected in parallel.

From this, as a function of the phase position and of the combination of the capacitances as effected owing to $\bar{E}$, $\bar{F}$, $\bar{G}$, there will result the contents of Table 5 for calculating the resulting parallel-additional capacitance (cf. FIG. 6) by taking into consideration the values given in Table 4:

Table 5

| Phase position | | 1' | 2' | 3' | 4' | 5' | 6' | 7' | 8' |
|---|---|---|---|---|---|---|---|---|---|
| Switching State of | C1 | φ | L | φ | L | φ | L | φ | L |
| | C2 | φ | φ | L | L | φ | φ | L | L |
| | C3 | φ | φ | φ | φ | L | L | L | L |
| Resulting parallel capacitance | | 0 | 800 | 1600 | 2400 | 3200 | 4000 | 4800 | 5600 |

Figure 7:
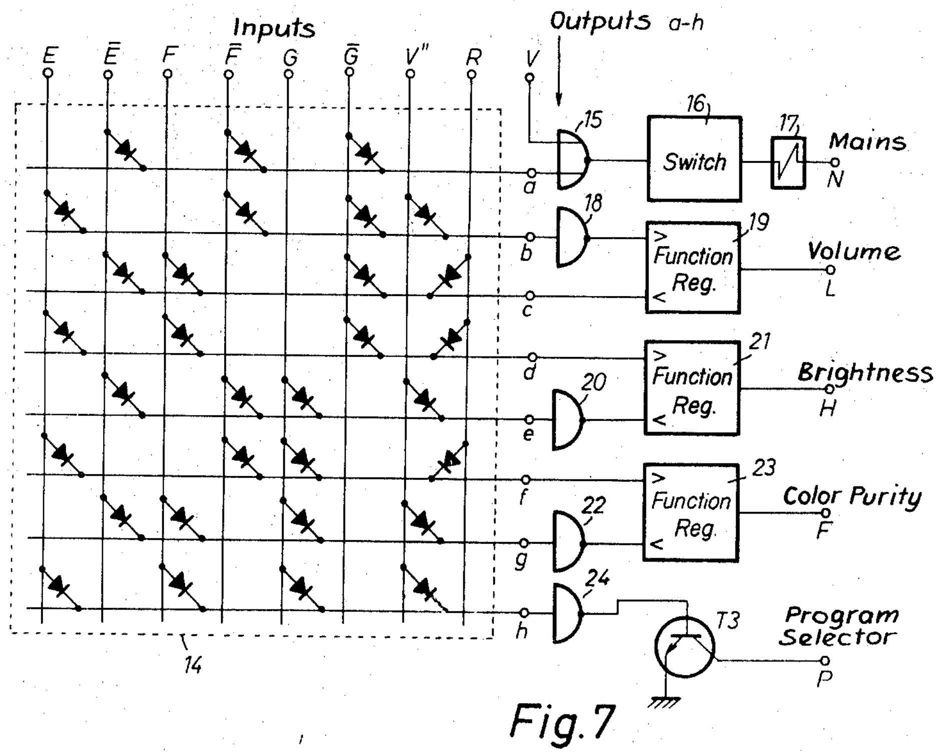
FIG. 7 shows a diode gate used in accordance with the invention.

Some of the outputs of the control circuit shown in FIG. 4, also control the inputs of the diode gate 14 shown in FIG. 7.

In synchronism with the eight phase positions there are also switched the eight outputs *a* to *h* in FIG. 7 of the diode gate 14. Apart from the inverted output signals $\bar{E}$, $\bar{F}$ and $\bar{G}$, also the direct output signals E, F and G of the divider stages 8, 9 and 10 are applied to the inputs of the diode gate 14. In this particular form, the diode gate is effective as an OR-circuit (see Table 1). Only if, simultaneously, a φ signal is apparent at all of the respective associated diode inputs of the diode gate 14, also the associated output will transmit a φ-signal. The diagrams shown in FIG. 8 (see FIG. 6 with non-inverted signals), illustrate that this condition occurs with respect to each output in each of the other eight phase positions 1' . . . 8', as is described with reference to Table 6, in which there are simultaneously shown the switched frequencies or capacitances respectively, (Table 4 and 5):

Table 6

| Phase position | φ-State (from FIG. 8) | Additional Capacitance (Table 5) | Receiving Frequency (at 8800 pF+$C_o$) | Function |
|---|---|---|---|---|
| 1' | E F G | 0 pF | 45,00 kHz | a mains on-off (N) |
| 2' | E F G | 800 pF | 43,08 kHz | b sound volume+(L) |
| 3' | E F G | 1600 pF | 41,39 kHz | c sound volume− |
| 4' | E F G | 2400 pF | 39,89 kHz | d brightness +(H) |
| 5' | E F G | 3200 pF | 38,54 kHz | e brightness− |
| 6' | E F G | 4000 pF | 37,31 kHz | f color purity+(F) |
| 7' | E F G | 4800 pf | 36,20 kHz | g color purity− |
| 8' | E F G | 5600 pF | 35,18 kHz | h progr. selector (P) |

It will be seen that the horizontal rows in this Table correspond to the respective horizontal rows of the diode gate 14.

From the foregoing Table there may be recognized the chosen assignment of the receiving and the command frequency to the outputs *a* to *h* of the diode gate, as well as the operating functions connected thereto, which is cyclically applied, but only through-connected in the presence of an associated command signal or a so-called AS-pulse of corresponding phase position respectively. In order to make sure that the diode gate 14 will only transmit a φ-pulse to the output in cases where the command frequency associated therewith is being transmitted and received, all outputs, in addition to the diodes belong to E, F, G and $\bar{E}$, $\bar{F}$, $\bar{G}$, are connected via further diodes belonging to R and V'', to one of those two inputs of the diode gate 14, to which a V''- and the R-signal are applied and which, in turn, among others, as is still to be described herein, are dependent upon the so-called AS-pulse of the command signals. These two φ-signals only occur simultaneously with the already known AS-signal, but are prepared in a special way in order to enable the slower operating rhythm as well as a forward- (V) and backward-control (R) of the operating registers or the operating functions respectively. As long as the V'' or R-pulses are found to be absent, all of the outputs of the diode gate 14 will remain blocked. Deviation of these pulses will be explained hereinafter. One of the prerequisites to this end is the V-pulse which is also required for the mains on-off switching 16 ahead of the mains switching relay 17 in FIG. 7. The reference numerals 18, 20, 22, 24 indicate inverters.

Generation of the V-pulse

The V-pulse is a regenerated AS-pulse, by which it is also tripped with the period of 80 ms. Since this AS-pulse is obtained from a rectified rf signal via a subsequently arranged lowpass filter circuit, this signal is delayed with respect to the control signals which serve to open and close the diode gate 14 for the associated outputs. The time delay effects a noise pulse at the output cyclically connected as the subsquently following one. This noise pulse is suppressed in that the V-pulse commences with a time delay of about 1, 25 ms with respect to the "preparatory signal," but terminates together therewith.

Figure 8:
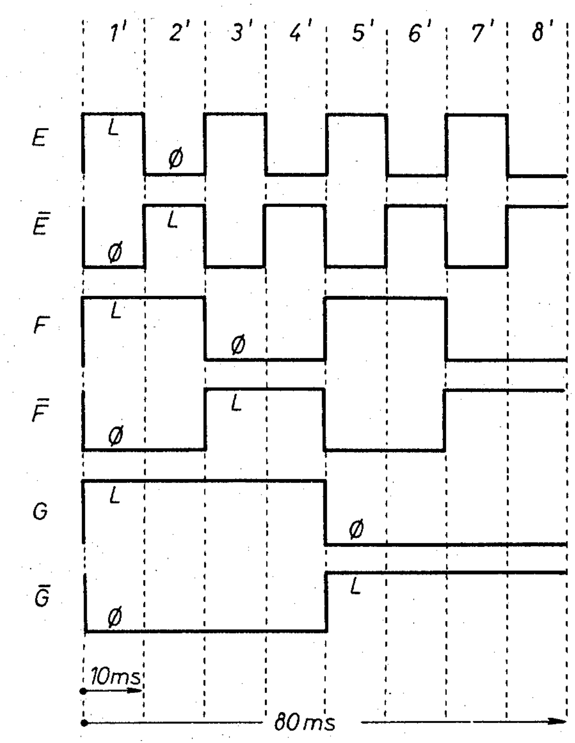

As "preparatory signals" in this respect, there are termed those pulses which are generated from the rectangular pulses E, E, F, F, G and G according to FIG. 8 in each of the phase positions 1' . . . 8' with a pulse width of about 10 ms, in the diode gate 14, thus successively prepare each output of the gate for being opened by a V''- or R-pulse.

Figure 9:
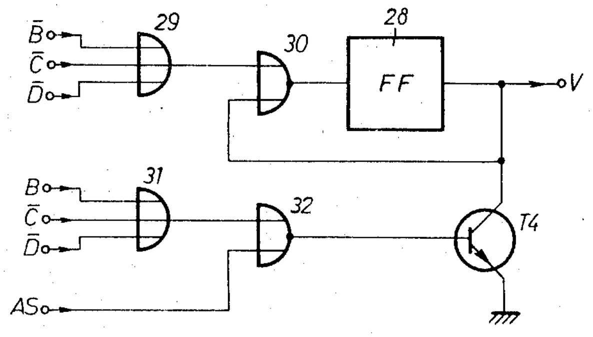
FIG. 9 shows a circuit for generating the pre-trigger pulses as well as the trailing and the leading pulses (V-pulses)

The V-pulse occurs at the output of the flip-flop 28 in FIG. 9 in the form of a $\phi$-pulse. This pulse is initiated by the pre-trigger pulse $\bar{B}\ \bar{C}\ \bar{D}$, as obtained from the divider flip-flops 5, 6 and 7 as well as the inverters 26 and 27 in FIG. 4. From FIG. 10 it may be taken that the pulses B, $\bar{C}$ and $\bar{D}$ only reach the $\phi$-position when being simultaneously in the phase position 2'', with the pretrigger pulse B $\bar{C}\ \bar{D}$ (see FIGS. 9 and 10) occurring at the output of the OR-gate 31 in FIG. 9, to the inputs of which these pulses are applied. This pretrigger pulse, with the aid of the transistor T4 only switches the output of the flip-flop 28 to the $\phi$-state if simultaneously an AS-signal occurs at the second input of the NOR-gate 32, hence when the command signal transmitter is actuated.

Figure 10:
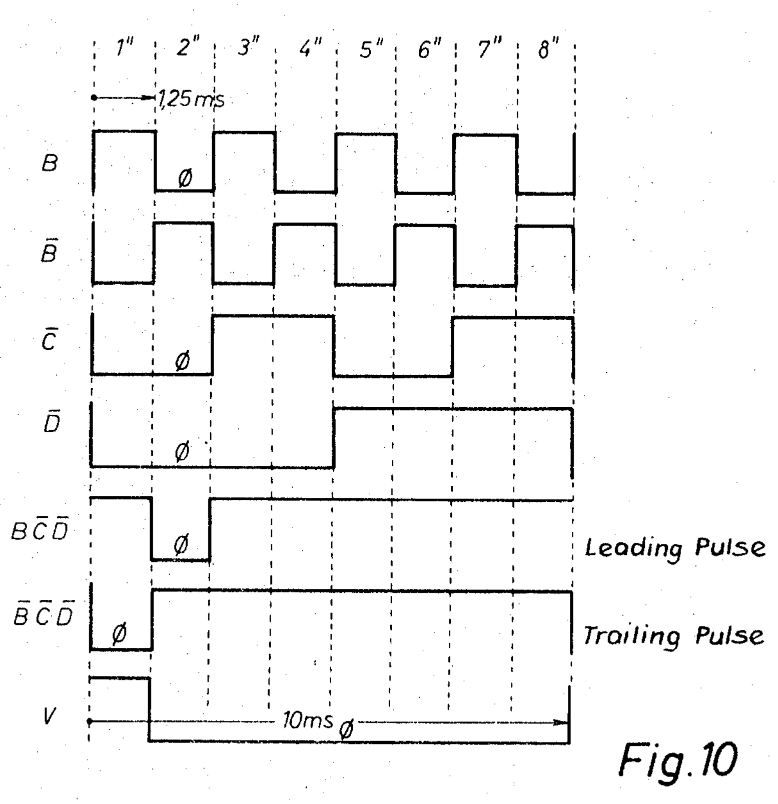
FIG. 10 shows the diagrams associated therewith.

Accordingly, the V-pulse commences 1, 25 ms after the start of the period (see lowest diagram in FIG. 10). 8, 75 ms later, at the end of the old and at the beginning of the new period, the divider flip-flops 5, 6 and 7, via the inverters 25, 26, and 27 and the OR-gate 29, generate the post-trigger pulse $\bar{B}\ \bar{C}\ \bar{D}$. This post-trigger pulse of course, in the phase position 1'' of each period, is also present at the first input of the NOR-gate 30, but remains ineffective as long as the output of the flip-flop 28 remains in the L-state and, with this potential at the second input of the NOR-gate 30, takes care that no L-pulse is transmitted by the NOR-gate output to the flip-flop input. Since prior thereto, however, the pre-trigger pulse has established the $\phi$-position of the two possible states at the output of the flip-flop, with the V-pulse thus having commenced, the post-trigger pulse $\bar{B}\ \bar{C}\ \bar{D}$ can reset the flip-flop output to the L-state, and is thus capable of terminating the V-pulse (FIGS. 9 and 10).

The generation of the V''-pulse from the V-pulse

The V''-pulse is identical to the V-pulse as regards duration, phase position and polarity. Its repetition frequency, however, only amounts to one seventh of the 12,5-Hz-frequency of the V-pulse. This pulse effects the alteration steps of the function registers in the forward direction successively following in this rhythm with a spacing of about 0,56 s. Its phase position 1' . . . 8', thereby, corresponds to the assignment of the frequency as radiated by the command signal.

Figure 11:
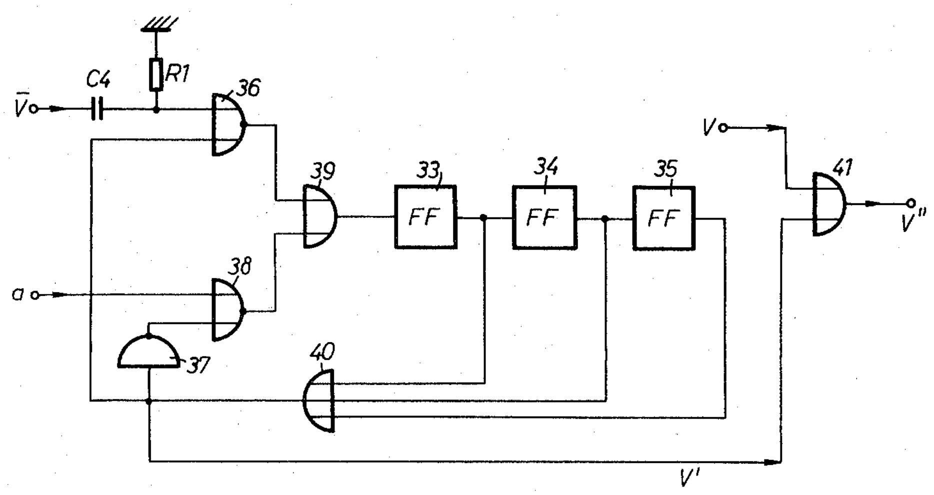
FIG. 11 shows a circuit for generating the V''-pulses.

In order to slow down the V-pulse to one seventh of its original repetition frequency, there is used a three-stage binary interval counter 37, 38, 39 (FIG. 11). The first counting step thereof commences with the trailing edge of the $\bar{V}$-pulse as differentiated at C4/R1. The remaining seven counting steps are controlled by the output a (FIGS. 11 and 7) of the diode gate 14 with its $\bar{E}\ \bar{F}\ \bar{G}$ -pulse being in the phase position 1'. This pulse, as already mentioned, is used for the mains on-off switching, and is in this case utilized as well for achieving a phase generation which is insensitive to disturbances and, thus solves the aforementioned part of the problem in a simple way.

The $\bar{E}\ \bar{F}\ \bar{G}$ -pulse occurs periodically and uninterruptedly also without a command signal reception in the phase position 1' according to FIGS. 6 or 8 respectively. Owing to the continued counting which is independent of the received signals after the start, there is not only achieved the desired insusceptibility to interferences, but there is also prepared the most favorable starting position for the new command signals. Since the first generated V-pulse simultaneously serves to generate the V'' -pulse, the waiting time from the reception of the command signal until the reaction of a function register or of the program selector amounts to 70 ms in the utmost.

The OR-gate 40 as supplied by the three flip-flop outputs 33, 34, and 35, only releases the starting pulse for the first counting step at the second input of the NOR-gate 36 in FIG. 11 if all outputs of the counter have assumed the $\phi$-position. The gate 36 is immediately reblocked after the first counting step, because the seven following counting positions at the output of the OR-gate 40 produce the L-state, with the reversal thereof, however, in the inverter 37, preparing the OR-gate 38 for the continued counting with the next or following seven E F G -pulses (from the output *a* of the diode gate 14, FIGS. 7, 8 and 11). After these pulses have continued to control the counting cycle up to the position in which all outputs of the counter are again in the $\phi$-position, this counter remains inoperative until a new starting pulse arrives.

Figure 12:
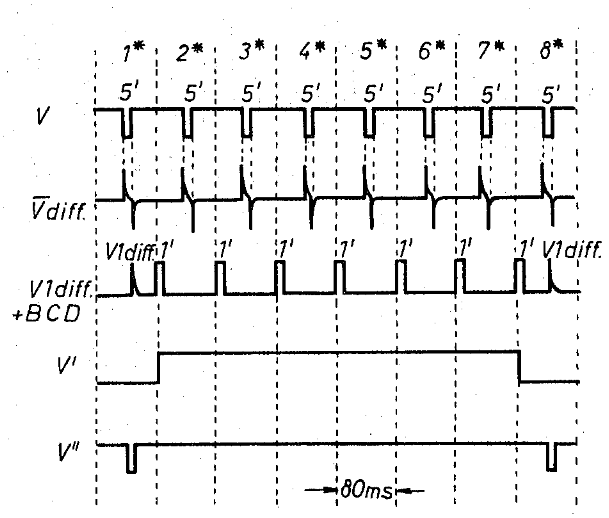
FIG. 12 shows the diagrams associated therewith.

FIG. 12 shows the most important signals of the circuit shown in FIG. 11, as occurring there subsequently to the tripping of a sequence of V-pulses at a command signal frequency which, in this particular example, is associated with the phase position 5'. (The phase position 5' of the V-pulse shown in the first row of the diagram, FIG. 12, corresponds to the center (5'') of the V-pulse shown in the last row of FIG. 5, but represented at a different scale.) Of the differentiated sequence of pulses $\bar{V}_{diff}$ (second row, FIG. 12) only the first differentiated and again inverted pulse $V_{1diff}$ becomes effective in the period $1^+$ at the input of the counting flip-flop stage 36. During the next periods $2^+$ . . . $7^+$ this pulse is relieved by the inverted $\bar{B}\ \bar{C}\ \bar{D}$ -pulses B C D in the phase position 1' (relative thereto, see FIG. 10). In period $8^+$ a new counting cycle starts with the next triggered pulse $V_{1diff}$.

The signal V' as taken off the output of the OR-gate 40 is at L-potential only during the seven counting steps which are initiated or released by the $\bar{E}\ \bar{F}\ \bar{G}$ -pulses. In the counting intervals and during the first V-pulse, the potential is $\phi$. Combining the V- and the V''-signal at the inputs of the OR-gate 41 will produce at the output of the gate the V''-signal with the compulsory interval amounting to almost seven 80-ms periods.

Generation of the R-pulse

For effecting the backward control of the registers in the function registers there is used an (N-1)-burst as has already been described in greater detail hereinbefore (see also German Pat. application No. P 21 38, 876, W. Schroder-46), and which in this case is referred to as the R-signal. N indicates the possible number of alteration steps of one register. The function registers are respectively designed for eight variable steps or stages which are set in the forward direction with the aid of simple pulses. One sevenfold burst must in that case be available for each backward step.

Figure 13:
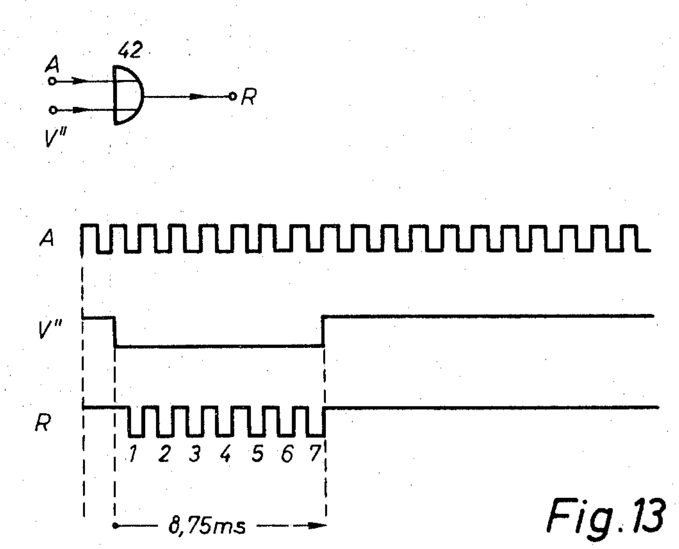
FIG. 13 shows a circuit and diagrams for explaining the generation of the return pulses (R-pulses).

The sevenfold burst R is generated in a simple way with the aid of the OR-gate 42 according to FIG. 13, with the first input thereof being connected to the output A of the 1,600-HZ-multivibrator 4 as shown in FIG. 4, and with the second input thereof receiving the V''-pulses. For reasons already explained hereinbefore, the V''-pulse is by one eighth shorter than the preparatory signals *a* to *h*. At the output of the OR-gate 42, therefore, each V''-pulse is only modulated by seven rectangular alternations of the A-signal. The thus resulting sevenfold burst R, via one input of the diode gate 14 according to FIG. 7, supplies the three "backward"-inputs of the function registers 19, 21 and 23.

While the principles of the invention have been described in connection with specific structure it is to be clearly understood that this description is made only by way of example and not as a limitation to the scope of my invention as set forth in the objects thereof and in the accompanying claims.

What is claimed is:

1. A command signal receiver for use in a remote control system of the type that controls a number of operating functions in a remote apparatus by transmitting a command signal having a frequency selected from a number of predetermined frequencies, each of said predetermined frequencies corresponding to one of said operating functions to be controlled, said receiver comprising:

command signal receiving means for receiving said command signal and providing an output signal in response thereto;

tuning means associated with said receiving means for tuning said receiving means successively and periodically to said predetermined frequencies, whereby the amplitude of the said output signal changes significantly when said receiver is tuned to the frequency of the command signal;

amplitude filter means for receiving the output signal from the command signal receiving means and in response to said changed amplitude provides an amplitude signal at a filter output;

a number of output means each associated with an operating function for providing an output to said operating function; and switch means connected to said filter output and associated with said tuning means and responsive thereto for successively connecting said filter output to each of said output means so that the filter output is connected to the output means associated with the operating function corresponding to the frequency to which the receiving means is tuned, whereby the amplitude signal is provided as periodic amplitude signal pulses for the digital control of the operating function corresponding to the selected frequency of the command signal.

2. A command signal receiver for use in a remote control system of the type that controls a number of operating functions in a remote apparatus by transmitting a command signal having a frequency selected from a number of predetermined frequencies, each of said predetermined frequencies corresponding to one of said operating functions to be controlled, said receiver comprising:

command signal receiving means for receiving said command signal and providing an output signal in response thereto;

tuning means associated with said receiving means for tuning said receiving means to said predetermined frequencies, whereby the amplitude of said output signal changes significantly when said receiver is tuned to the frequency of the command signal;

amplitude filter means for receiving the output signal from said command signal receiving means and in response to said changed amplitude provides an amplitude signal at a filter output;

a number of output means each associated with an operating function for providing an output to said operating function; and electronic rotary switch means connected to said tuning means for control thereof to successively and periodically tune said receiver means to each of said predetermined frequencies and for successively connecting said filter output to each of said output means so that the filter output is connected to the output means associated with the operating function corresponding to the frequency to which the receiving means is tuned, whereby the amplitude signal is provided as a periodic amplitude signal pulse for the digital control of the operating function corresponding to the selected frequency of the command signal.

3. A command signal receiver as described in claim 2, wherein said tuning means comprises a fixed capacitor and a plurality of additional capacitors adapted to be connected in parallel with the fixed capacitor by said electronic rotary switch.

4. A command signal receiver as described in claim 3, wherein there are n additional capacitors for tuning to $2^n$ different frequencies.

5. A command signal receiver as described in claim 4, wherein each additional capacitor has a capacitance equal to twice the capacitance of the next lower capacitor.

6. A command signal receiver as described in claim 2, wherein the electronic rotary switch includes:

means for providing a clock pulse chain; and a binary frequency divider connected to receive said clock pulse chain and including an n stage binary divider portion for providing n signal outputs, said signal outputs being provided to said tuning means for successively tuning said receiver means to $2^n$ different command signal frequencies.

7. A command signal receiver as described in claim 6, wherein said tuning means comprises a fixed capacitor and n additional capacitors adapted to be connected in parallel with said fixed capacitor by said electronic rotary switch.

8. A command signal receiver as described in claim 3, wherein the electronic rotary switch means additionally comprises electronic switch means connected in series with each of said additional capacitors for connecting said capacitors in parallel with said fixed capacitor.

9. A command signal receiver as described in claim 8, wherein each electronic switch means comprises:

a transistor;

a diode connected anti-parallel with said transistor, said transistor connected to receive a current at the base thereof so that the transistor is rendered conductive during a positive phase of the oscillator voltage of the tuning circuit and the diode is rendered conductive during the negative phase of the oscillating voltage to thereby connect the additional capacitor in parallel with said fixed capacitor, the diode being so dimensioned so that in the switched off state of the transistor, the oscillating voltage of the tuning circuit is rectified to generate a reverse voltage on the diode thereby blocking the diode.

10. A command signal receiver as described in claim 4, wherein the electronic rotary switch includes:

means for providing a clock pulse chain; and a binary frequency divider connected to receive said clock pulse chain and including an n stage binary divider portion for providing n signal outputs, said signal outputs being provided to electronic switch means for connecting said n additional capacitors in parallel with said fixed capacitor for successively tuning said receiver means to $2^n$ different command signal frequencies.

11. A command signal receiver as described in claim 6, wherein said electronic rotary switch additionally comprises:

inverting means for receiving the n signal outputs and for providing n inverted signal outputs;

a diode matrix for receiving the n signal outputs, the *n* inverted signal outputs and the amplitude signal pulses and in response thereto for connecting said filter output to the output means associated with the operating function corresponding to the frequency to which the receiving means is tuned.

12. A command signal receiver as described in claim 11, additionally comprising means for extending the duration between amplitude signal pulses provided to the output means whereby the rate of change of the operating function is made compatible with human reaction time to prevent overshooting the desired setting of the operating function.

13. A command signal receiver as described in claim 12, wherein the means for extending the duration includes a binary encoded counter.

14. A command signal receiver as described in claim 11, additionally including:

additional dividing stages between said means for providing a clock pulse chain and the n stage binary divide portion for providing a pulsed output having a frequency m times greater than the highest frequency output than the n stage binary divider portion;

means, receiving said amplitude signal pulses, for blocking said pulses for a period equal to $1/m$ of the duration of the amplitude signal pulses; and gate means for receiving the pulsed output from the additional dividing stages and the partially blocked amplitude signal pulse and for providing in response thereto a burst of $m$-1 pulses which burst is connected through said electronic rotary switch to an output means for effecting a single backwards step in an operating function having $m$ stepped positions.

* * * * *